April 4, 1933.  J. SÖLL  1,903,408
PROCESS OF PREPARING HYDROFLUORIC ACID
Filed July 7, 1931
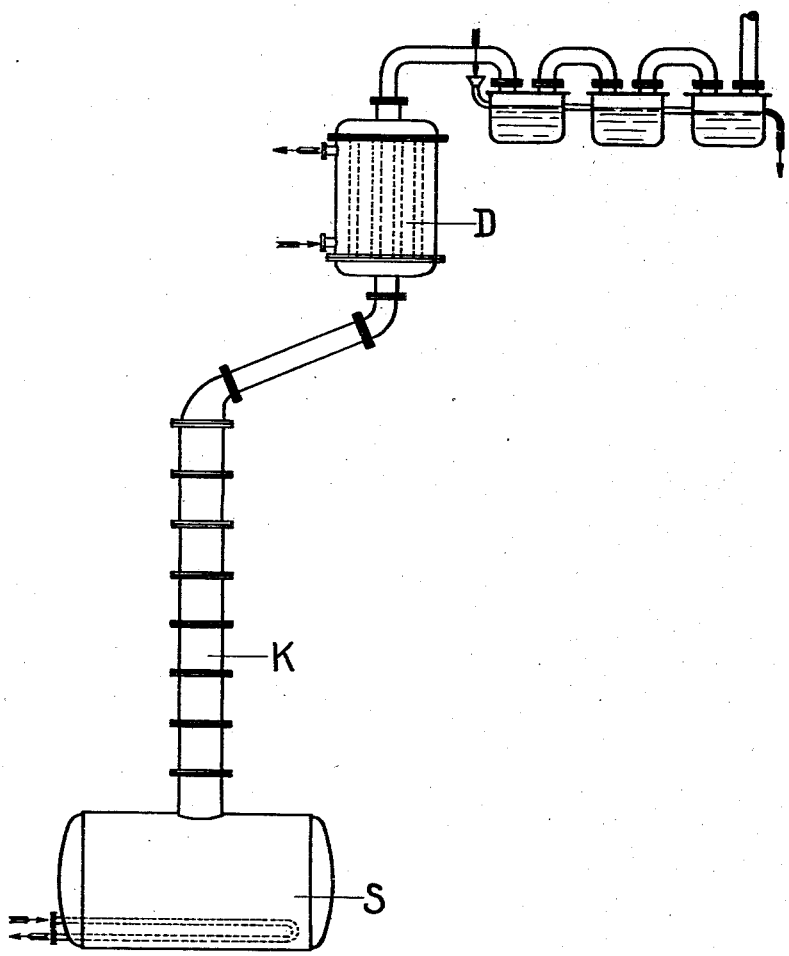
INVENTOR
Julius Söll,
BY
Byrnes Townsend & Potter,
ATTORNEYS.

Patented Apr. 4, 1933

1,903,408

UNITED STATES PATENT OFFICE

JULIUS SÖLL, OF FRANKFORT-ON-THE-MAIN-SCHWANHEIM, GERMANY, ASSIGNOR TO I. G. FARBENINDUSTRIE AKTIENGESELLSCHAFT, OF FRANKFORT-ON-THE-MAIN, GERMANY

PROCESS OF PREPARING HYDROFLUORIC ACID

Application filed July 7, 1931, Serial No. 549,291, and in Germany January 30, 1930.

The present invention relates to a process of preparing hydrofluoric acid practically free from silicic acid.

Commercial hydrofluoric acid is always more or less contaminated by silicic acid, because the fluorite used for its preparation always contains silicic acid and the silicic acid distils in the form of silicon fluoride together with the hydrofluoric acid. For rendering the hydrofluoric acid suitable for the preparation of pure fluorine compounds, the fluosilicic acid had hitherto to be eliminated in a rather onerous manner comprising precipitating it in the form of sodium— or potassium-silico-fluoride by adding sodium carbonate, potassium carbonate or other potassium—or sodium salts and drawing the precipitate.

I have now found that hydrofluoric acid free or practically free from silicic acid can be separated by distillation from silicic acid containing hydrofluoric acid which is not too concentrated and which contains up to 80 per cent of hydrogen fluoride. This process can be carried out at least in all those cases in which in the hydrofluoric acid used as starting material only a relatively small portion of the hydrofluoric acid is bound to silicic acid, as is generally the case in the commercial product. Only when the content of silicic acid in the liquid subjected to distillation has been increased to a considerable extent due to the progressive concentration, a mixture of hydrofluoric acid and fluosilicic acid distils. This mixture contains about such a quantity of silicic acid that half of the hydrofluoric acid is bound in the form of fluosilicic acid. It was a rather surprising fact that the above-mentioned hydrofluoric acid containing silicic acid yielded a distillate practically free from silicic acid, because it is known that fluosilicic acid containing more than 13 per cent of $H_2SiF_6$ yields a distillate richer in silicon fluoride than corresponding to the composition of the boiling acid. Furthermore, the boiling points of hydrofluoric acid and fluosilicic acid are so close together that it is surprising that the acids easily separate during the distillation and that, if a hydrofluoric acid containing up to 40 per cent of HF is used, a distillate is obtained containing only 0.2 per cent of $SiO_2$ or even less. Even if an acid containing 60–65 per cent of HF or more is distilled, there is obtained an acid which is technically sufficiently pure, though its content of silicic acid is somewhat higher due to the fact that the solubility of the silicon fluoride decreases with the strength of the hydrofluoric acid. When, for instance, as starting material there is used a hydrofluoric acid of 65 per cent strength, an acid is obtained by distillation containing $H_2SiF_6$ corresponding to an amount of about 0.3–0.5 per cent of $SiO_2$.

From 100 parts of hydrofluoric acid of 40 per cent strength containing 2.3 per cent of $SiO_2$, there are obtained by distillation 80 parts of hydrofluoric acid containing 0.2 per cent of $SiO_2$, while in the still 20 parts of hydrofluoric acid containing 11 per cent of $SiO_2$ remain. The distillation may be carried out with or without using a rectifying column. If a dilute hydrofluoric acid (for instance of 25 per cent strength) is distilled without using such column, a more dilute acid than the starting acid, for instance, an acid of 15 per cent strength, distils first, and then a stronger hydrofluoric acid, for instance, of 35 per cent strength, being poor in silicic acid. In order to decrease the $SiO_2$-content of the hydrofluoric acid obtained by distillation, the distilling vapors of hydrofluoric acid may be washed with aqueous hydrofluoric acid poor in silicic acid and which may also contain an alkali fluoride. The distillation may also be carried out under a reduced pressure.

If an acid of a still higher concentration is used as starting material, for instance, an acid containing from 80 per cent to 100 per cent of HF, the solubility of the silicon fluoride is so small that the distillation takes a course different from that described above. In this case first the silicon fluoride passes over in mixture with the strong acid which distils first. From such a mixture of vapours of silicon fluoride and hydrofluoric acid there can be obtained hydrofluoric acid nearly completely free from silicic acid by condensing the vapours at sufficiently low temperatures, whereas the non-condensed vapours chiefly consisting of silicon fluoride can be obtained separately. The hydrofluoric acid poor in or free from silicic acid which is obtained by refrigeration from the distilling vapours according to this method of working may be withdrawn for use. But it may also be very suitable to cause this hydrofluoric acid to run back into the distilling vessel until the boiling liquid contains no more silicon. It is thus possible to maintain the strength of the acid in the distilling vessel to approximately the original height, this being favorable with regard to the elimination of the silicon fluoride. A particularly advantageous method of working consists in causing the hydrofluoric acid condensed from the boiling vapours to trickle through these vapours in a reflux condenser or a distillation column, the latter being preferred. In this case silicon fluoride can still be distilled off even from a hydrofluoric acid containing only 40 per cent of hydrogen fluoride besides fluosilicic acid.

The annexed diagrammatic drawing serves to illustrate more clearly the execution of the latter process, without limiting the present invention to it.

In the distilling vessel S the hydrofluoric acid to be desilicified and containing, for instance, 70 per cent of HF is heated to boiling. The vapors are conducted into the column K which suitably is kept cool, filled with rings or other material or provided with perforated bottoms. From the column K the vapors are passed to the reflux condenser D wherein the hydrofluoric acid is condensed by means of a sufficiently low temperature and caused to return through the column K to the distilling vessel S, whereas the silicon fluoride distils and can be condensed in a receiver together with water (in the form of steam or in the liquid condition) in the form of fluosilicic acid. By maintaining a certain temperature in a given reflux condenser D, it is possible to bring about a condition in which the escaping silicon fluoride is mixed with such a quantity of hydrofluoric acid that fluosilicic acid ($H_2SiF_6$) is produced and dissolved in the water for absorbing it without separation of silicic acid taking place. By further lowering the temperature in the reflux condenser, there are obtained vapours of a silicon fluoride which contains so small a quantity of hydrofluoric acid that when leading these vapours into water, silicic acid is separated by hydrolysis, which can be eliminated by filtration. The temperature in the refrigerator D required for a desired and distinct composition of the distilling gases depends on the effectiveness of the refrigerator and on the composition of the boiling liquid and has to be ascertained by experiment. Thus, for obtaining pure fluosilicic acid, the best temperature is 0° in the refrigerator D.

It is known that from fluorite having for instance a content of about 5% to 10% silicic acid there is obtained an aqueous hydrofluoric acid having a higher content of hydrogen fluoride than corresponding to the acid showing a constant boiling point, even when this fluorite is acted upon with a sulfuric acid which is not completely concentrated. According to the present invention it is now possible to obtain a hydrofluoric acid nearly completely free from silicic acid even from such a $SiO_2$-contaminated less valuable fluorite by condensing the mixture of vapours set free from the fluorite regardless of their water-content, by refrigeration, and then desilicifying the crude hydrofluoric acid thus obtained according to the process described above. The industrial progress of the new process consists in the complete separation of hydrofluoric acid and fluosilicic acid without any intermediate fractions. If a less highly concentrated hydrofluoric acid is used, the process may be carried out as follows:

A hydrofluoric acid containing 59 per cent of total HF comprising $H_2SiF_6$ corresponding to 2.3 per cent of $SiO_2$ is freed as much as possible from silicic acid by eliminating $SiF_4$ by distillation as described above. There remains in the still a hydrofluoric acid containing 52 per cent of HF and 1.3 per cent of $SiO_2$. This hydrofluoric acid is distilled on an ascending refrigerator until 80 per cent have passed over in the form of hydrofluoric acid containing 0.15 per cent of $SiO_2$. The remaining 20 per cent of hydrofluoric acid in which silicic acid is enriched is desilicified with the next batch as described. It is thus possible completely to work up impure hydrofluoric acid and to produce hydrofluoric acid poor in silicic acid on the one hand and fluosilicic acid on the other hand.

I claim:

1. The process of preparing hydrofluoric acid practically free from silicic acid which comprises subjecting a crude hydrofluoric acid containing silicic acid and up to 60–65 per cent of hydrogen fluoride to a fractional distillation and causing an aqueous hydrofluoric acid poor in silicic acid to act upon the vapors of hydrogen fluoride distilling over.

2. The process of preparing hydrofluoric acid practically free from silicic acid which comprises subjecting a crude hydrofluoric acid containing silicic acid and more than 40 per cent of hydrogen fluoride to a fractional distillation whereby a mixture of vapors of hydrogen fluoride and silicon fluoride distils over and separating these vapors from one another by a cooling process.

3. The process of preparing hydrofluoric acid practically free from silicic acid which comprises subjecting a crude hydrofluoric acid containing silicic acid and more than 40 per cent of hydrogen fluoride to a fractional distillation whereby a mixture of vapours of hydrogen fluoride and silicon fluoride distils over, cooling the mixture thus obtained and leading the condensed hydrogen fluoride back to the still.

4. The process of preparing hydrofluoric acid practically free from silicic acid which comprises subjecting a crude hydrofluoric acid containing silicic acid and more than 40 per cent of hydrogen fluoride to a fractional distillation whereby a mixture of vapours of hydrogen fluoride and silicon fluoride distils over, cooling the mixture thus obtained and leading the condensed hydrogen fluoride back to the distillation device in such a manner that the condensed hydrogen fluoride comes in contact in a distillation column with the mixture of vapours distilling over.

5. The process of preparing hydrofluoric acid practically free from silicic acid which comprises subjecting a crude hydrofluoric acid containing silicic acid and more than 40 per cent of hydrogen fluoride to a fractional distillation whereby a mixture of vapours of hydrogen flouride and silicon fluoride distils over, cooling the mixture thus obtained and leading the condensed hydrogen fluoride back to the still in such a manner that it trickles through the mixture of vapours distilling over.

6. The process of preparing hydrofluoric acid practically free from silicic acid which comprises subjecting a crude hydrofluoric acid containing silicic acid and up to 80% of hydrogen fluoride to a fractional distillation, whereby a mixture of vapors of hydrogen fluoride and silicon fluoride distils over, and separating these vapors from one another by a cooling process.

In testimony whereof, I affix my signature.

JULIUS SÖLL.